Figure 1:
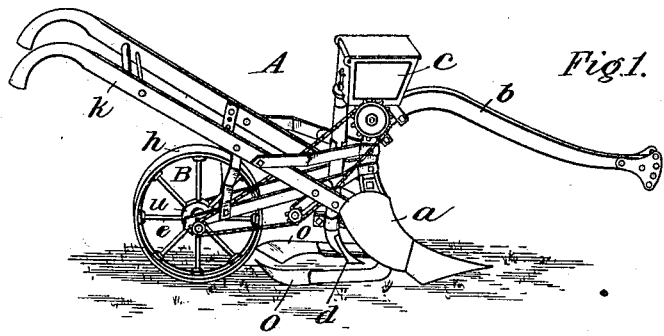

(No Model.)

J. P. BLACK.
PLANTING PLOW.

No. 360,271. Patented Mar. 29, 1887.

Witnesses:
J. B. Dover.
Arthur Hollady.

Inventor
Joseph P. Black
By John Lane
Att'y

UNITED STATES PATENT OFFICE.

JOSEPH P. BLACK, OF ALTON, ILLINOIS, ASSIGNOR TO THE HAPGOOD PLOW COMPANY, OF SAME PLACE.

PLANTING-PLOW.

SPECIFICATION forming part of Letters Patent No. 360,271, dated March 29, 1887.

Application filed January 24, 1887. Serial No. 225,236. (No model.)

*To all whom it may concern:*

Be it known that I, JOSEPH P. BLACK, a citizen of the United States, residing at Alton, in the county of Madison and State of Illinois, have invented a new and useful Improvement in Planting-Plows, of which the following is a specification.

This invention relates to planting-plows, and has for its object to provide the plow with an operating-wheel having a rim, which may be removed by the operator and the wheel used either with or without the rim, as desired by the operator and as may best suit the condition of the soil or ground to be planted.

Heretofore in planting-plows the operating-wheel has generally been made with a wide tire-rim, smoothing and packing the soil over the planted corn. Such a rimmed wheel, while doing its work in the best manner when the soil was dry and in good condition, has been found objectionable after a rain, when the soil was wet, in that such wet soil would at times clog upon the wheel, at other times be so packed and smoothed by the rim of the wheel that in drying out would bake, and harden so dry and hard that the planted seeds would die and never sprout up through such covering. An operating-wheel, known as a "rimless" or "sprocket" wheel, has been used in an effort to overcome the objections to a rimmed wheel, and it has been found that such rimless wheel, while working better in wet soil, was objectionable in dry soil, in that such dry soil needed packing over the planted seeds, which such rimless wheel could not do and which only the rimmed wheel could do. My invention overcomes all these heretofore objections.

The invention consists in providing the operating-wheel of a planting-plow with spokes adapted to be used rimless and with a rim adapted to be attached to said wheel, and the wheel made either rimmed or rimless by the placing or removing the rim.

Referring to the drawings, like letters refer to like parts in all the figures, in which—

Figure 2:
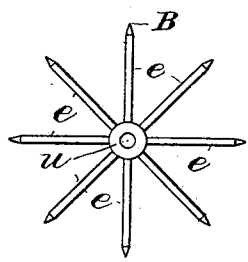
Figure 3:
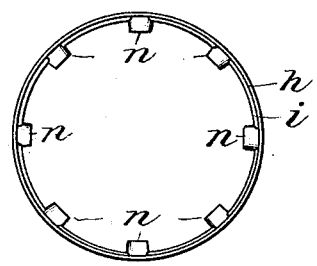
Figure 4:
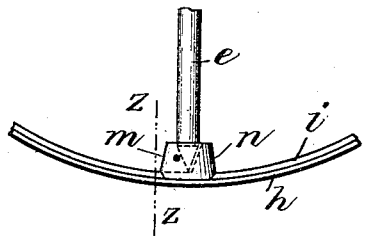
Figure 5:
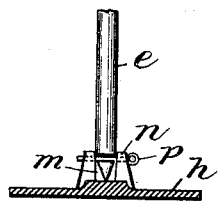
Figure 6:
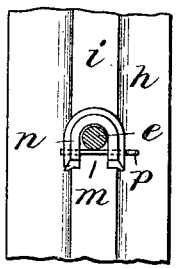

Figure 1 is a perspective view of a planting-plow having my improvements, showing the operating-wheel B with the rim $h$ attached thereto. Fig. 2 is a side view, enlarged, of the wheel B, rimless, showing the spokes $e$, with sharp-pointed ends, adapted for use without the rim $h$. Fig. 3 is a side view, enlarged, of the rim $h$, showing how it is constructed, with a series of lugs or seats $n$, adapted to receive or seat the ends of the spokes $e$. Fig. 4 is a sectional view in side elevation, enlarged, showing by dotted lines how the ends of the spokes $e$ are seated in the recess $m$ in the seat $n$ of the rim $h$. Fig. 5 is a cross-sectional view taken on the dotted line $z$ in Fig. 4, showing the recess $m$ and the construction of parts. Fig. 6 is a top view of same as Fig. 4, showing the recess $m$ with the spoke $e$ seated therein, and also showing how the pin or bolt $p$ may be used to retain the spoke in the seat.

The planting-plow may be provided with the plow $a$, the beam $b$, the seed-box $c$, with dropping mechanism, and handles $k$, of any known construction, as shown.

B represents the wheel, consisting of the hub $u$, provided with the series of spokes $e$, having their outer ends adapted to enter the ground and be used without a tire or rim, as shown in Fig. 2. I have shown the said spokes preferably sharp-pointed. They may be otherwise shaped without departing from my invention.

$h$ represents a wheel tire or rim, consisting of a flat web-ring, preferably provided with a central thickening or web, $i$, to stiffen the rim, and provided with the series of lugs or seats $n$, provided with the recess $m$, adapted to receive and seat the ends of the spokes $e$ in the attachment of the rim to the wheel, as shown in the drawings. The said lugs or seats $n$ may be provided with the pin or bolt $p$, to retain the spoke in the seat in the rim. Any other construction of the said rim may be used without departing from my invention, and the rim may be made in parts, connected together when attached to the wheel. I preferably make the rim solid of cast-iron, and the wheel of a cast-iron hub with wrought-iron or steel spokes, and attach the rim to the wheel in any suitable manner, when desired, as shown.

In operation, the planting-plow is operated as usual in being drawn along the ground. The plow opens a wide furrow, the drill-tooth making a slit along the center of the furrow, the seed dropped at intervals along said slit, after which covering-blades may follow and close the slit, and the wheel B, following, operating the seed-dropping, and when said wheel is provided with the rim $h$, it will smooth and compact the soil over the planted seed in the best manner when the soil is dry or not in a wet and sticky condition. Then after a rain, or when the soil is wet and in a sticky condition, in which the clogging of said rim and packing of the soil is objectionable, the operator may remove the said rim and use the wheel rimless as a sprocket-wheel, in which the spokes will enter the ground and rotate the wheel operating the seed-dropping mechanism without clogging the wheel and without compacting the soil over the planted seeds, and then, after the soil again becomes suitably dry, the operator may replace the rim as at first, obviating all the heretofore objections.

Having thus set forth my invention, what I claim, and desire to secure by Letters Patent of the United States, is—

1. In a planting-plow, the operating-wheel consisting of the hub provided with spokes adapted to enter the ground and a rim removable and provided with means for attachment to said wheel, substantially as and for the purpose set forth.

2. In a planting-plow, the operating-wheel provided with spokes adapted to be used without a rim and a rim adapted to be attached to and removed from the spokes by the operator, substantially as and for the purpose set forth.

3. The rim provided with a series of seats, in combination with the wheel provided with spokes adapted to enter the ground, and said seats adapted to seat said spokes in the attachment of said rim to the wheel, substantially as and for the purpose set forth.

4. In combination with the wheel provided with spokes, the removable rim adapted to be applied and removed, said rim provided with seats adapted to connect with said spokes, and means for retaining the said spokes, substantially as and for the purpose set forth.

JOSEPH P. BLACK.

Witnesses:
  W. H. PAGE,
  A. K. LINDSLEY.